United States Patent
Wolf

(10) Patent No.: US 11,893,650 B2
(45) Date of Patent: Feb. 6, 2024

(54) SYSTEMS AND METHODS FOR CONNECTING MARKET PARTICIPANTS

(71) Applicant: Greenlight, LLC, Orinda, CA (US)

(72) Inventor: Tommy Wolf, Walnut Creek, CA (US)

(73) Assignee: Greenlight, LLC, Phoenix, AZ (US)

( * ) Notice: Subject to any disclaimer, the term of this patent is extended or adjusted under 35 U.S.C. 154(b) by 0 days.

(21) Appl. No.: 17/001,415

(22) Filed: Aug. 24, 2020

(65) Prior Publication Data

US 2021/0056649 A1   Feb. 25, 2021

Related U.S. Application Data

(60) Provisional application No. 62/891,208, filed on Aug. 23, 2019.

(51) Int. Cl.
| | |
|---|---|
| *G06Q 50/16* | (2012.01) |
| *G06Q 50/00* | (2012.01) |
| *G06Q 30/0201* | (2023.01) |

(52) U.S. Cl.
CPC ......... *G06Q 50/16* (2013.01); *G06Q 30/0201* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 10,002,398 B1* | 6/2018 | Isaacson | .............. | G06Q 50/188 |
| 10,037,558 B1* | 7/2018 | Thomas | ............. | G06Q 30/0623 |
| 2002/0052814 A1* | 5/2002 | Ketterer | ................ | G06Q 40/04 |
| | | | | 705/35 |
| 2011/0078138 A1* | 3/2011 | Cardella | .............. | G06F 16/903 |
| | | | | 707/723 |
| 2012/0190386 A1* | 7/2012 | Anderson | ............... | G01S 19/14 |
| | | | | 455/456.3 |
| 2013/0339189 A1* | 12/2013 | Minerick | ............... | G06Q 50/16 |
| | | | | 705/26.41 |
| 2015/0332418 A1* | 11/2015 | Wilson | ................... | G06Q 10/00 |
| | | | | 705/313 |
| 2016/0155181 A1* | 6/2016 | Romaya | ............... | G06Q 50/167 |
| | | | | 705/26.63 |
| 2018/0211340 A1* | 7/2018 | Cook | .................... | G06Q 50/167 |
| 2018/0300826 A1* | 10/2018 | Weiss | ..................... | G06Q 40/03 |
| 2021/0056649 A1* | 2/2021 | Wolf | ..................... | G06Q 50/01 |
| 2021/0241398 A1* | 8/2021 | Tuite | .................... | G06Q 50/163 |

* cited by examiner

*Primary Examiner* — Jamie H Austin

(74) *Attorney, Agent, or Firm* — LKGlobal | Lorenz & Kopf, LLP

(57) ABSTRACT

A system for connecting market participants is disclosed. The system may receive a first user data comprising a market participant type. The system may receive a first metadata set associated with the first user data and a second metadata set associated with a second user data, wherein the second metadata set comprises the market participant type. The system may generate a match data based on the first metadata set, the second metadata set, and the market participant type, wherein the match data defines an association between the first user data and the second user data. The system may generate a communication channel between a first user device and a second user device based on the match data.

12 Claims, 10 Drawing Sheets

SYSTEMS AND METHODS FOR CONNECTING MARKET PARTICIPANTS

CROSS REFERENCE TO RELATED APPLICATIONS

This application is a non-provisional of, and claims priority to and benefit of, U.S. Provisional Application No. 62/891,208 filed on Aug. 23, 2019 and entitled "SOFTWARE APPLICATION FOR CONNECTING REALTORS TO HOME BUYERS AND SELLERS," which is incorporated by reference in its entirety.

TECHNICAL FIELD

The present disclosure generally relates to mobile devices, and in particular to systems and methods for mobile and automated connection of real estate market participants.

BACKGROUND

Traditionally, real estate market participants are connected via private networks and dedicated channels. Such platforms tend to be limited in capability and may only be accessible during market hours, to certain classes of participants, or may otherwise be restricted in geographic or temporal availability. Additionally, options for viewing participant data and performance feedback may be limited. Accordingly, improved mobile connection platforms, for example platforms for direct connection and lead generation, remain desirable.

SUMMARY

In various embodiments, systems, methods, and articles of manufacture (collectively, the "system") for connecting market participants are disclosed. In various embodiments, the system may receive a first user data comprising a market participant type. The system may receive a first metadata set associated with the first user data and a second metadata set associated with a second user data, wherein the second metadata set comprises the market participant type. The system may generate a match data based on the first metadata set, the second metadata set, and the market participant type, wherein the match data defines an association between the first user data and the second user data. The system may generate a communication channel between a first user device and a second user device based on the match data.

In various embodiments, the system may receive a confirm match input from the first user device and the second user device and start a communication process in response to the confirm match input. In various embodiments, the system may receive a search distance, display a map page, and populate the map page with a plurality of icons, wherein each of the icons are associated with matched market participants, and wherein the population of icons is determined based on the search distance. In various embodiments, the system may generate a baseline user rating based on the first metadata set and the second metadata set and update the baseline user rating based on changes in at least one of the first metadata set or the second metadata set. In various embodiments, the market participant type comprises at least one of buyer, seller, or broker. In various embodiments, the first metadata set and the second metadata set include at least one of interest tags, type tags, and location tags.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
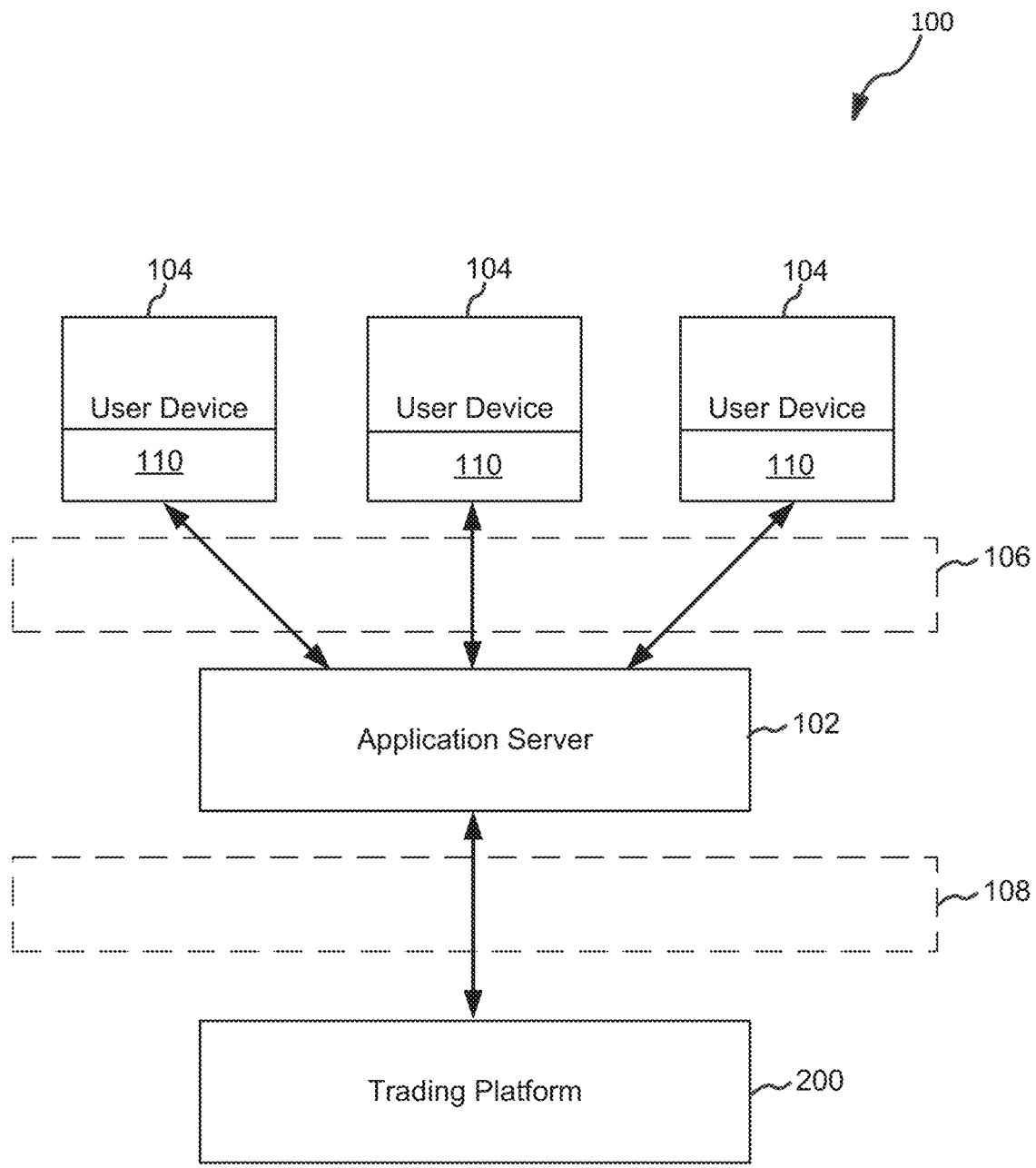
FIG. 1 is a block diagram illustrating various system components of a system for connecting market participants, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for mobile device application design and implementation, as well as conventional mobile device communications techniques, interface elements, and so forth, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or communicative connections may be present in a practical system or related methods of use, for example a mobile trading application for cryptocurrency derivatives.

Various shortcomings of mobile device applications can be addressed by utilizing mobile device applications and/or related cloud-based systems configured in accordance with principles of the present disclosure. For example, the present system improves upon existing technology by optimizing displays into modes which carry out platform activities including setting leverage, by providing a single assembly flow for any order type, monitoring each of a balance, an order set, and positions associated with an account, and by visualizing risk levels associated with a specific position.

In various exemplary embodiments, the system may provide a greater level of sophistication and/or control for market participant connection systems. For example, data may be gathered from multiple data sources comprising multiple dissimilar rows and columns and may be distributed across multiple platforms. While prior art systems typically include the technical problem of limited availability, lack of integration, obfuscation of performance data and/or the like, the current system provides a technical solution by tending to enable a single open platform for market participant connection. In this regard, the system may enable accelerated trading via an integrated buyer, seller, broker environment, optimized data presentation, performance metric capture, and user preference tracking. As such, the system may eliminate or reduce information gaps, reduce re-entry of data, and reduce record duplication, and reduce search times. The system may also reduce the cost of system processing time for market search and data entry, reduce network utilization, and/or reduce data storage overhead. The system may increase data reliability and/or accuracy by enabling comparison of data between market participants at an increased frequency. The system may also reduce redundant or duplicate tasks, thereby reducing a demand for system resources. The system may simplify data acquisition and enhance the user experience by decreasing the number of user interactions e.g., for duplication of offers and listings across platforms may be reduced, multiple independent contact events between market participants may be batched into a single contact queue, and/or the like. Moreover, benefits of the present disclosure may apply to any suitable electronic exchange or trading platform.

Processes disclosed herein improve the functioning of the computer. In various s embodiments, connection processing speeds may be accelerated via a reduced interaction set enabled by a single inline connection flow. The system may further reduce inputs by enabling a universally accessible data set for machine learning and automated connection of market participants. In various embodiments, the system may reduce processing overhead by tending to reduce the need for multiple search queries to locate connection targets. For example, the system may display a geographic presentation of local participants or may present a curated set determined based on user metadata. Similarly, the process increases the reliability and speed of data presentation by enabling direct comparison of real time data between market participants on the basis of metadata elements. The system may automatically update its context to help provide information about a market participant. The system increases the reliability and speed of analysis by enabling a real-time view of market participant performance. For example, the system may display feedback scores for brokers, buyers, and sellers.

Thus, the system may tend to enable context based prediction of market participant connections and thereby further automate the connection process. In this regard, by transmitting, storing, and/or accessing data using the processes described herein, the informational utility of the data is improved, and errors are reduced. Such improvements may also increase the efficiency of the network by reducing a portion of duplicated effort as additional data sources are identified for comparison.

In various embodiments, and with reference now to FIG. 1, a system 100 for connecting market participants is depicted. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 may comprise an application server 102, a user device 104, and a an application service 200 (i.e., service 200). Any of these components may be outsourced and/or be in communication with the application server 102 and/or service 200 via a network such as, for example a first network 106 and a second network 108.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or service 200 may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the service 200 via the second network 108. In this regard, the application server 102 may allow communication from the user devices 104 to systems, engines, and components of system 100 (such as, for example, service 200). In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of data across networks (106, 108).

In various embodiments, a user device 104 may comprise software and/or hardware in communication with the system 100 via a network (e.g. network 106) comprising hardware and/or software configured to allow a user, and/or the like, access to the application server 102. The user device 104 may comprise any suitable device that is configured to allow a user to communicate with a network and the system 100. The user device may include, for example, a personal computer, personal digital assistant, cellular phone, kiosk, mobile device, and/or the like and may allow a user to transmit comparison requests to the system 100. In various embodiments, the user device 104 described herein may run a web application or native application to communicate with application server 102. A native application 110 may be installed on the user device 104 via download, physical media, or an app store, for example. The native application 110 may utilize the development code base provided for use with the operating system and capable of performing system calls to manipulate the stored and displayed data on the user device 104 and communicates with application server 102. A web application may be web browser compatible and written specifically to run on a web browser. The web application may thus be a browser-based application that operates in conjunction with application server 102.

In various embodiments, the native application 110 running on the user device 104 may be in communication with the application server 102 to support real-time updates. For example, data pertaining to the service 200 may synchronize across the various user devices 104 used by any number of users interacting with the application server 102 and/or service 200. In this regard, the application server 102 may serve data from service 200 to each of the user devices 104 and may serve commands from the user devices 104 to the service 200. In various embodiments, application server 102 may apply access permissions to restrict the data transmitted between the networks (106, 108) and/or the various components of system 100. Users may be authenticated on the native application 110, for example, via a user name, password, dual factor authentication, private cryptographic key, one-time password, security question, biometrics, or other suitable authentication techniques know to those skilled in the art.

Figure 2:
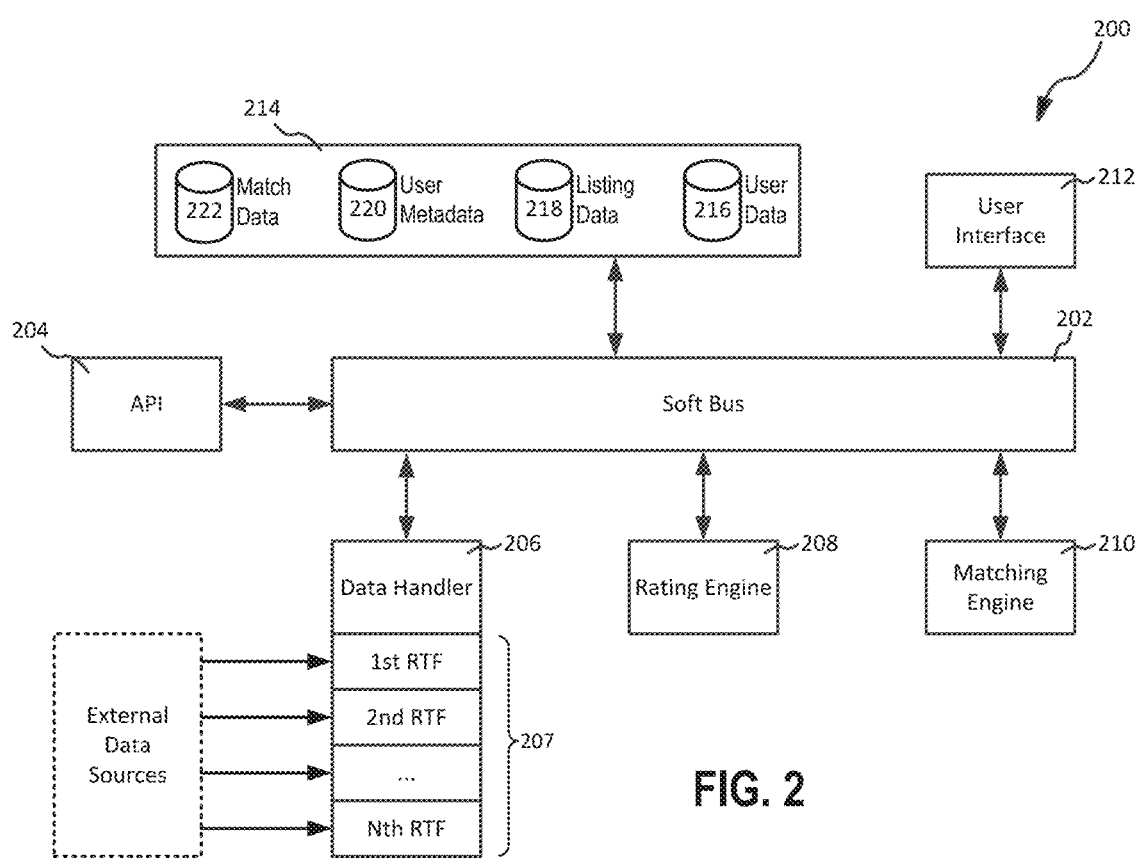
FIG. 2 illustrates a block diagram of a service in a system for connecting market participants, in accordance with various embodiments.

With additional reference to FIG. 2, a block diagram of a service 200 of system 100 is illustrated in accordance with various embodiments. Service 200 may comprise a software bus architecture 202, an application programming interface (i.e., API module 204), a data handler 206 module, a rating engine 208, a matching engine 210, a user interface module 212, and a database module 214.

In various embodiments, API module 204 may be configured to provide a programmatic interface to any of the set of system 100 or service 200 services, components, modules, and/or engines.

In various embodiments the data handler 206 is configured to capture and process data from one more external data sources into a plurality of data feeds 207 for use by the various systems, engines, and components of service 200. In various embodiments, the data feeds 207 may be real-time data feeds. The data handler may be capable of integrating with a variety of data sources. The data handler 206 may be configured to integrate with databases and large data sets such as, for example, merchant processors, nationwide multistate licensing system and registry, social media databases (e.g., FACEBOOK®, YOUTUBE®, INSTAGRAM®, GOOGLE® etc.), and/or the like.

In various embodiments, the rating engine 208 may be configured to process various elements of user data 216 and user metadata 220 such as, for example, interest tags, type tags, location tags, closing data, sales data, buyer feedback, seller feedback, and/or the like. The rating engine 208 may generate a baseline user rating based on the user data 215 and the user metadata 220 associated with a user. In various embodiments, the baseline user rater may be determined based on a market participant type associated with the user data. In various embodiments, the rating engine 208 may be configured to update the baseline user rating based on changes in the user metadata 220 over time.

In various embodiments, the matching engine 210 may be configured to generate matches between users based on the baseline user rating, the listing data 218, and the market participant type, a search distance, and/or the like. In various embodiments, the matching engine may be configured to generate a social graph based on the matches and the elements of user metadata 220 which may be stored as match data 222. The matching engine 210 may feed back the match data 222 to the rating engine 208 and, in that regard, changes in the match data 222 may affect and/or update the base line user rating. In various embodiments and with brief additional reference to FIGS. 4 and 5, the matching engine 210 may be configured to generate matches between users based on the metadata elements (502, 504, 506, 508, 510, 512, and 514) received via the user data page 500 and the various metadata elements (402, 404, 406, 408, 410) received via the search and settings page 400.

In various embodiments, the user interface module 212 may provide outputs from the service 200 to the user devices 104 and may receive inputs therefrom. The user interface module 212 may be configured to display various interface pages of the service 200.

In various embodiments, the database module 214 may include any number of data structures or data elements such as, for example, user data 216, listing data 218, user metadata 220, and match data 222. Database module 214 may be configured to maintain user data 216 such as, for example, user names, passwords, authentication data, user profiles, market participant type, addresses, biometric data, and/or the like. Database module 214 may be configured to maintain listing data, such as, for example, property addresses, images, price information, condition information, associated broker, associated seller, and/or the like. In various embodiments, database module 214 may be configured to maintain user metadata 220 such as, for example, user device 104 information associated with communication between the user device 104 and the service 200, page interaction metrics, interest tags, type tags, location tags, closing data, sales data, buyer feedback, seller feedback, and/or the like. In various embodiments, the database module 214 may be configured to maintain match data 222 such as, for example, a match table, a social graph of associations between users based on market participant type, and/or the like.

Figure 3:
FIG. 3 illustrates a startup page of a system for connecting market participants, in accordance with various embodiments.
Figure 3:
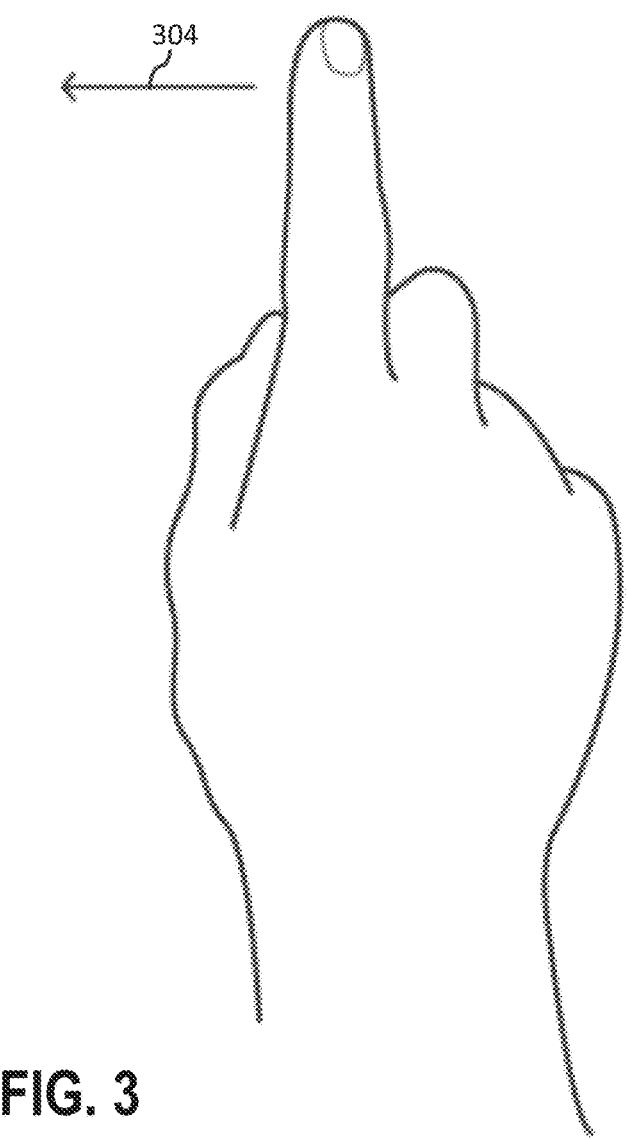

In various embodiments, and with additional reference to FIG. 3, a startup page 300 of system 100 is illustrated. Service 200 may display a logo 302 and may receive, via the user device 104, a user interaction with the logo such as, for example, a left swipe 304.

Figure 4:
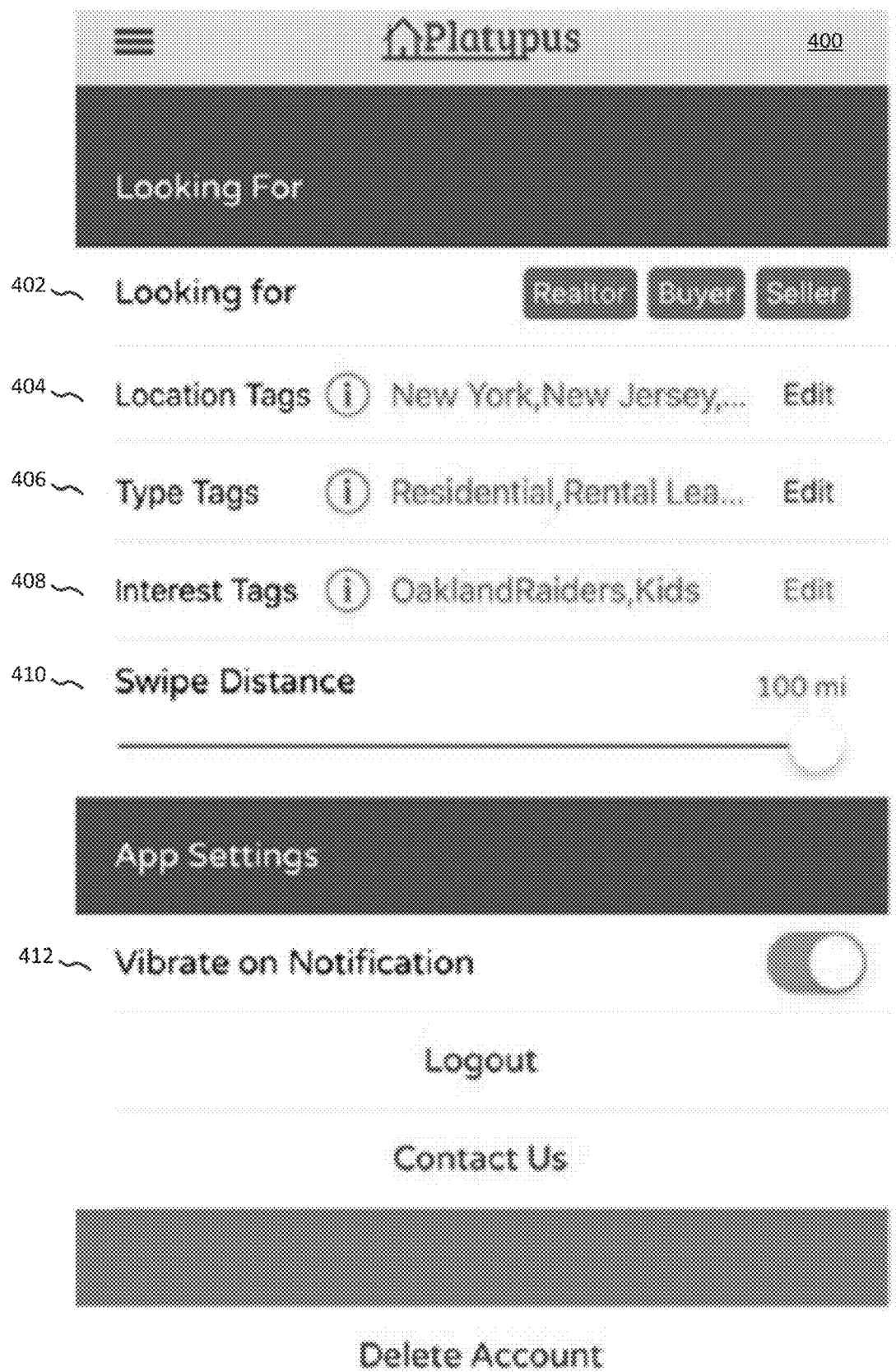
FIG. 4 illustrates a search and settings page of a system for connecting market participants, in accordance with various embodiments.

In various embodiments, and with additional reference to FIG. 4, a search and settings page 400 of system 100 is illustrated. In response to receiving the user interaction with the startup page 300, service 200 may display the search and settings page 400. The search and settings page 400 may be configured to receive user metadata 220 elements such as, for example, looking for type 402 (i.e., one of the market participant types), location tags 404, type tags 406, interest tags 408, search distance 410, and/or the like. The system may receive a looking for type 402 selection comprising the market participant type including at least one of 'buyer', 'seller', or 'broker'. The system may receive a location tags 404 input such as, a city, a town, an address, and/or the like. The system may receive a type tags 406 input comprising a property type such as, for example, residential, commercial, rental, lease, industrial, light industrial, retail, class A, class B, class C, and/or the like. The system 100 may receive interest tags 408 such as, for example, one or more text strings.

In various embodiments, the system may be configured to auto-complete and or auto-populate any of the metadata elements including the interest tags 408 based on data received by the data handler module 206 from the external data sources. In various embodiments, the system may be configured to auto-populate the location tags 404, type tags 406, and interest tags 408 based on a frequency distribution. In various embodiments, the system may receive a search distance 410 input. The search distance 410 may be received, for example, via a slider selection and thereby be user configurable between a minimum distance and a maximum distance. The system may pass the various metadata elements (402, 404, 406, 408, 410) received via the search and settings page to the matching engine 210 for further processing. In various embodiments, the service 200 may include settings configurations which may enable service 200 to command functions of the user device 104 such as, for example, vibrate notification 412.

Figure 5:
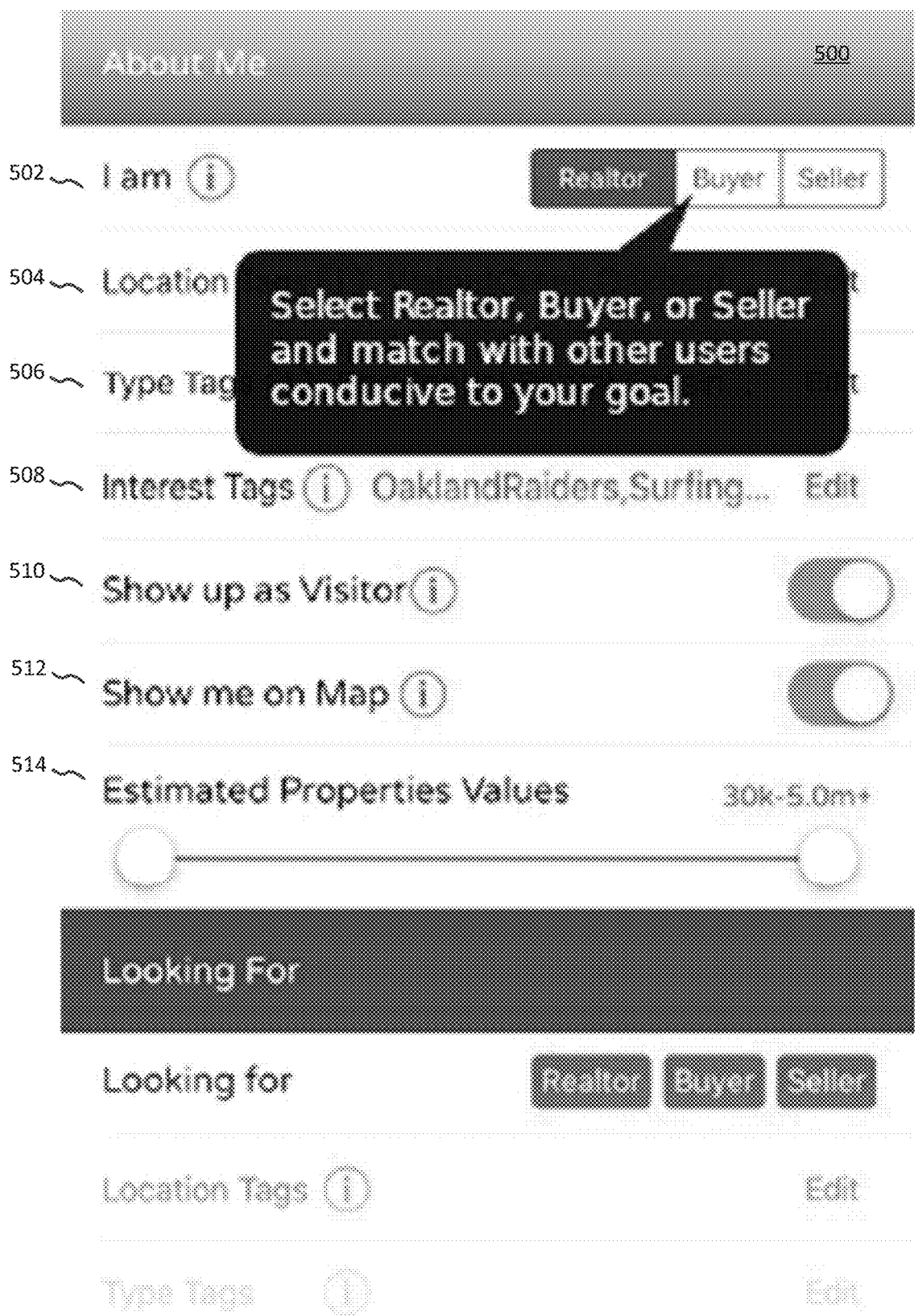
FIG. 5 illustrates a user data page of a system for connecting market participants, in accordance with various embodiments.

In various embodiments, and with additional reference to FIG. 5, a user data page 500 of system 100 is illustrated. The user data page 500 may be configured to receive user data 216 and user metadata 220 elements such as, for example, market participant type 502, current location 504, type tags 506, interest tags 508, visitor status 510, map display selection 512, and property value setting 514. The system may receive a market participant type 502 selection comprising the market participant type including at least one of 'buyer', 'seller', or 'broker'. The system may receive a current location 504 such as, for example, an address or a location data received from the user device 104. The system may receive a type tags 506 input comprising a property type such as, for example, residential, commercial, rental, lease, industrial, light industrial, retail, class A, class B, class C, and/or the like. The system may receive interest tags 508 such as, for example, a text string. In various embodiments, the system may be configured to auto-complete and or auto-populate any of the metadata elements including the interest tags 408 based on data received by the data handler module 206 from the external data sources. For example, the system may populate the interest tags 508 based on a FACEBOOK® account associated with the user data 216. The system may receive a visitor status 510 input and a map display selection 512 input, each of which may be Boolean. In various embodiments, the system may receive a property value setting 514 input. The property value setting 514 may be received, for example, via a slider selection and thereby be user configurable between a minimum price and a maximum price. The system may pass the various metadata elements (502, 504, 506, 508, 510, 512, and 514) received via the user data page 500 to the matching engine 210 for further processing.

Figure 6:
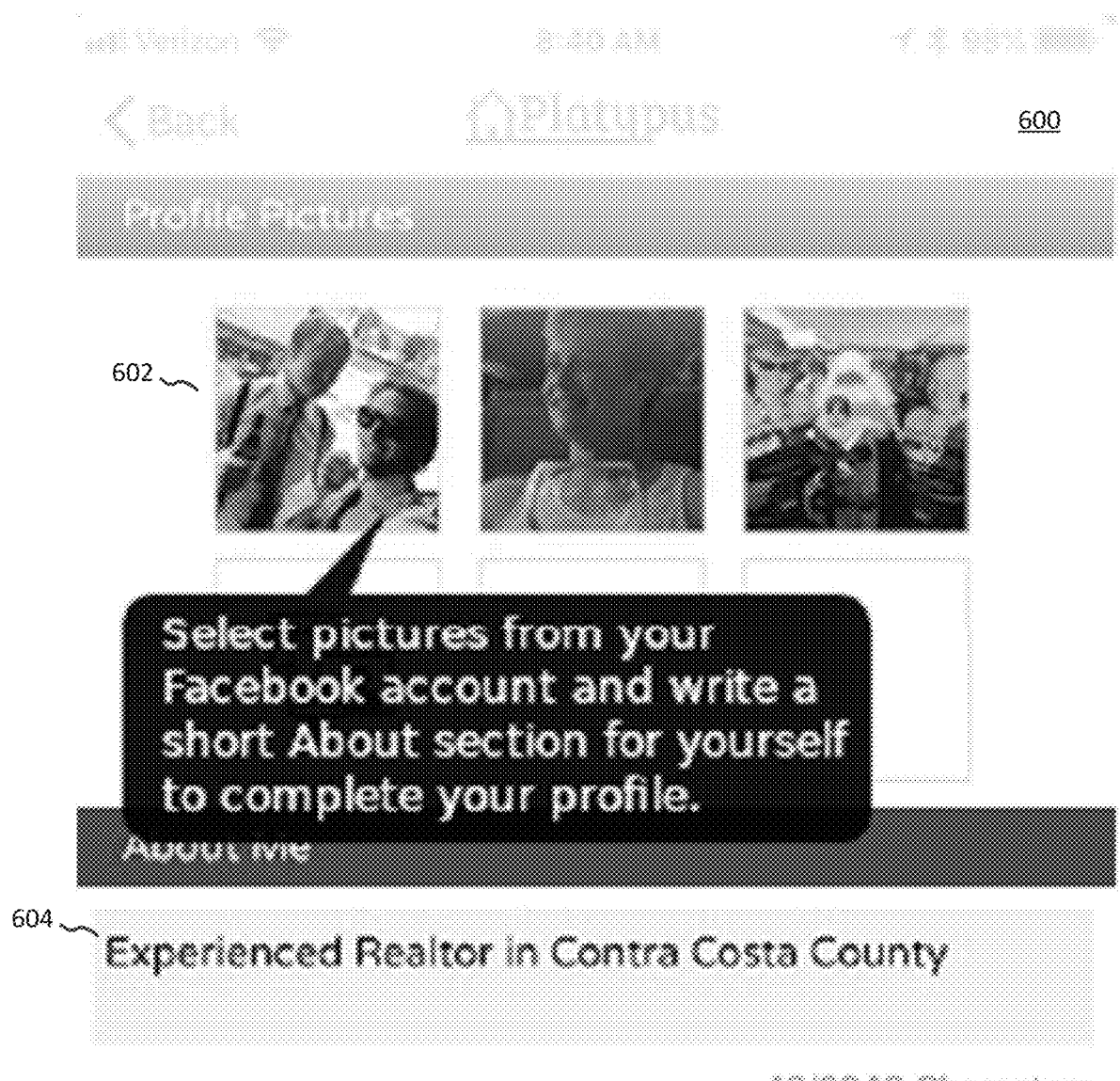
FIG. 6 illustrates profile picture page of a system for connecting market participants, in accordance with various embodiments.

In various embodiments and with additional reference to FIG. 6, a profile picture page 600 of system 100 is illustrated. The profile picture page 600 may be configured to receive user data 216 and enable a profile picture selection 602 input and a profile description 604 input. The system may receive one or more profile pictures from the user device 104 and may display the profile picture in the profile picture selection 602. The system may receive an interaction from the user with the profile picture selection 602 such as, for example, a tap and may associate the profile picture selection for display to market participants matched via the matching engine 210. In various embodiments, the system may be configured to auto-populate the profile picture selection 602 based on data received by the data handler module 206 from the external data sources. For example, the system may populate the profile picture selection 602 based on a FACEBOOK® account associated with the user data 216. In various embodiments, the system may receive a profile description 604 input comprising a text input. For example, the profile description 604 input may comprise text relating to market participant type and experience, e.g., 'Experienced Realtor on Contra Costa County'.

Figure 7:
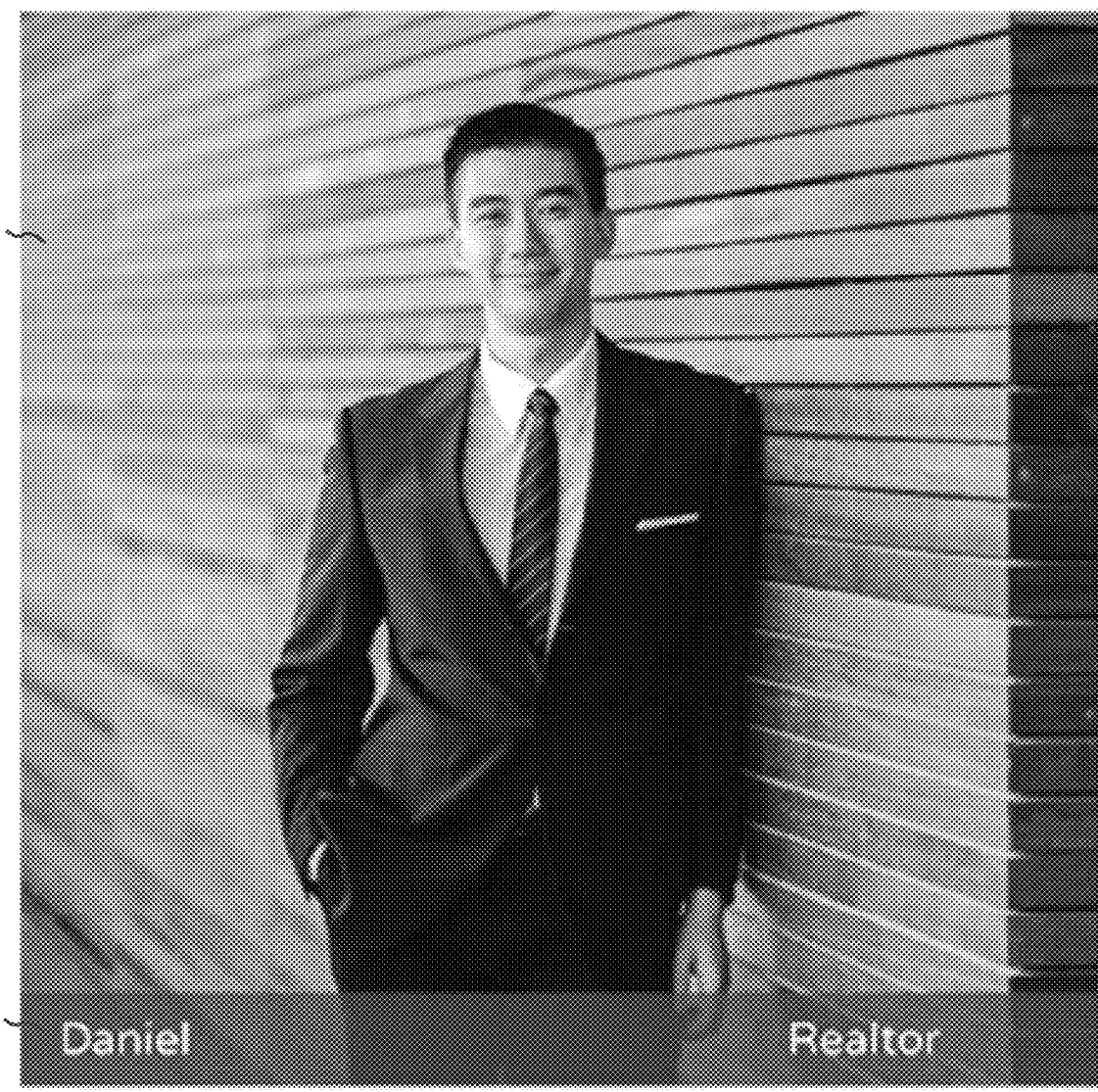
FIG. 7 illustrates a matching page of a system for connecting market participants, in accordance with various embodiments.
Figure 7:
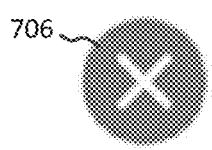
Figure 7:

In various embodiments and with additional reference to FIG. 7, a matching page 700 of system 100 is illustrated. The matching page 700 may display a profile picture 702 based on matches between market participants generated by the matching engine 210. The system may display user data 704 associated with the matched market participant. The matching page 700 may be configured to receive a match confirmation input which may be Boolean, e.g., a confirm match 708 or a deny match 706 input. In response to receiving the deny match 706 input, the system may display another profile picture based on the matches between market participants generated by the matching engine 210. In response to receiving the confirm match 708 input, the system may start a communication process between market participants matched by the matching engine. In various embodiments, the communication process may be started in response to receiving the confirm match input from each of the matched market participants.

Figure 8:
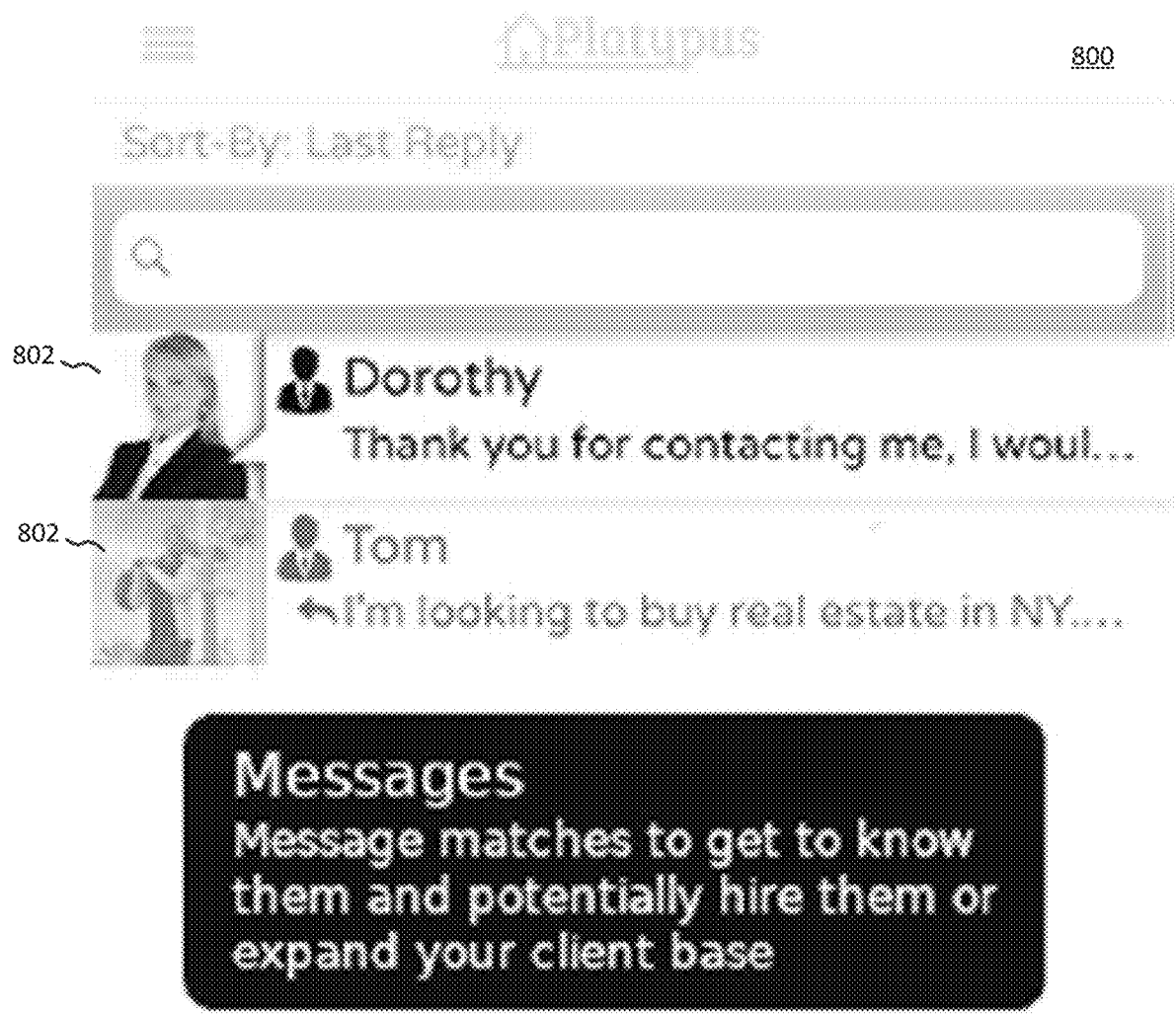
FIG. 8 illustrates a communication page of a system for connecting market participants, in accordance with various embodiments.

In various embodiments and with additional reference to FIG. 8, a communication page 800 of system 100 is illustrated. The communication page 800 may be configured to enable text based communication between each of the matched market participants. For example, the system may display a plurality of conversation threads 802. In this regard, the system 100 may generate a communication channel between a first user device and a second user device based on the match data and thereby enable enhanced and automated connecting of market participants.

Figure 9A:
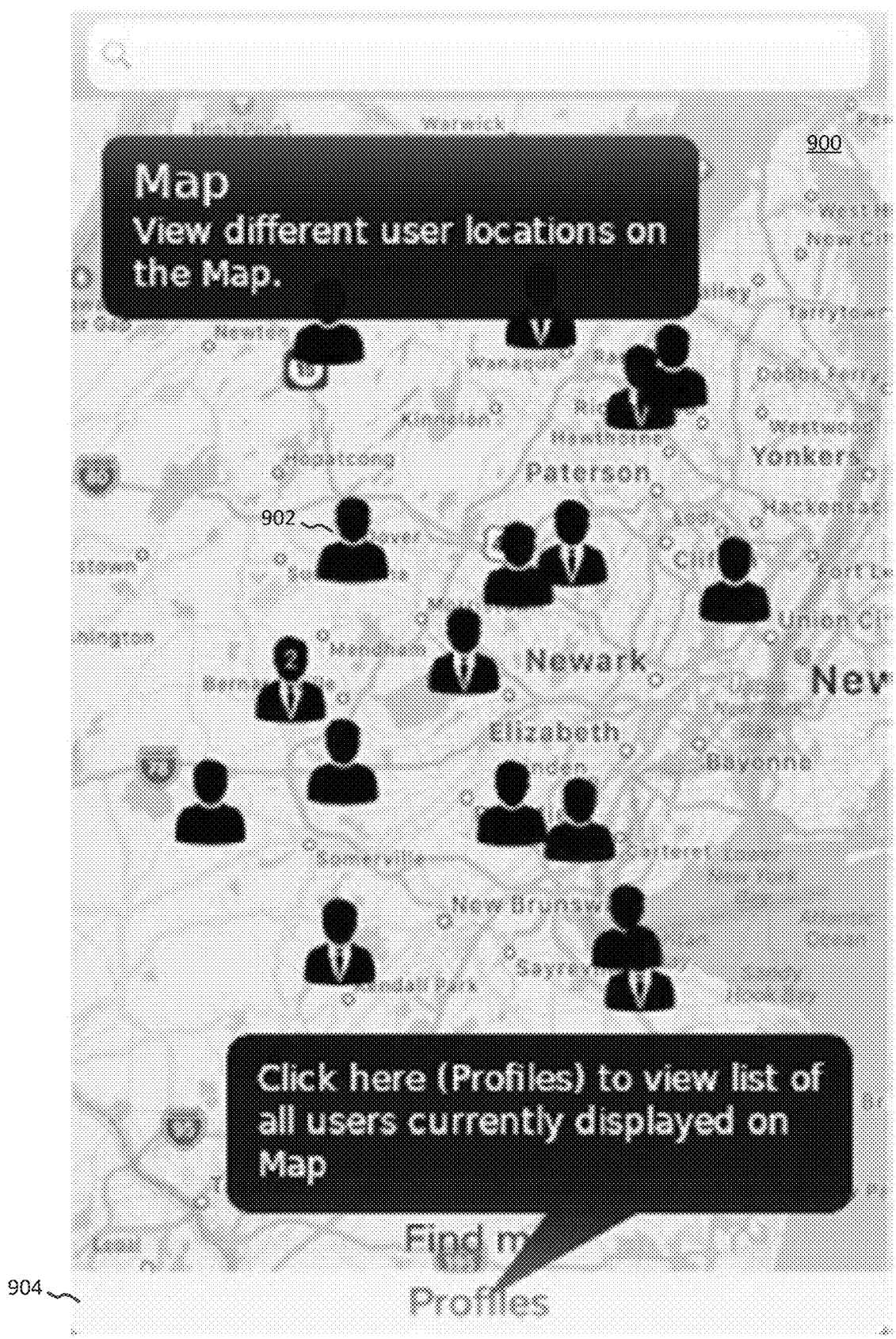
FIG. 9A illustrates map page of a system for connecting market participants, in accordance with various embodiments.
Figure 9B:
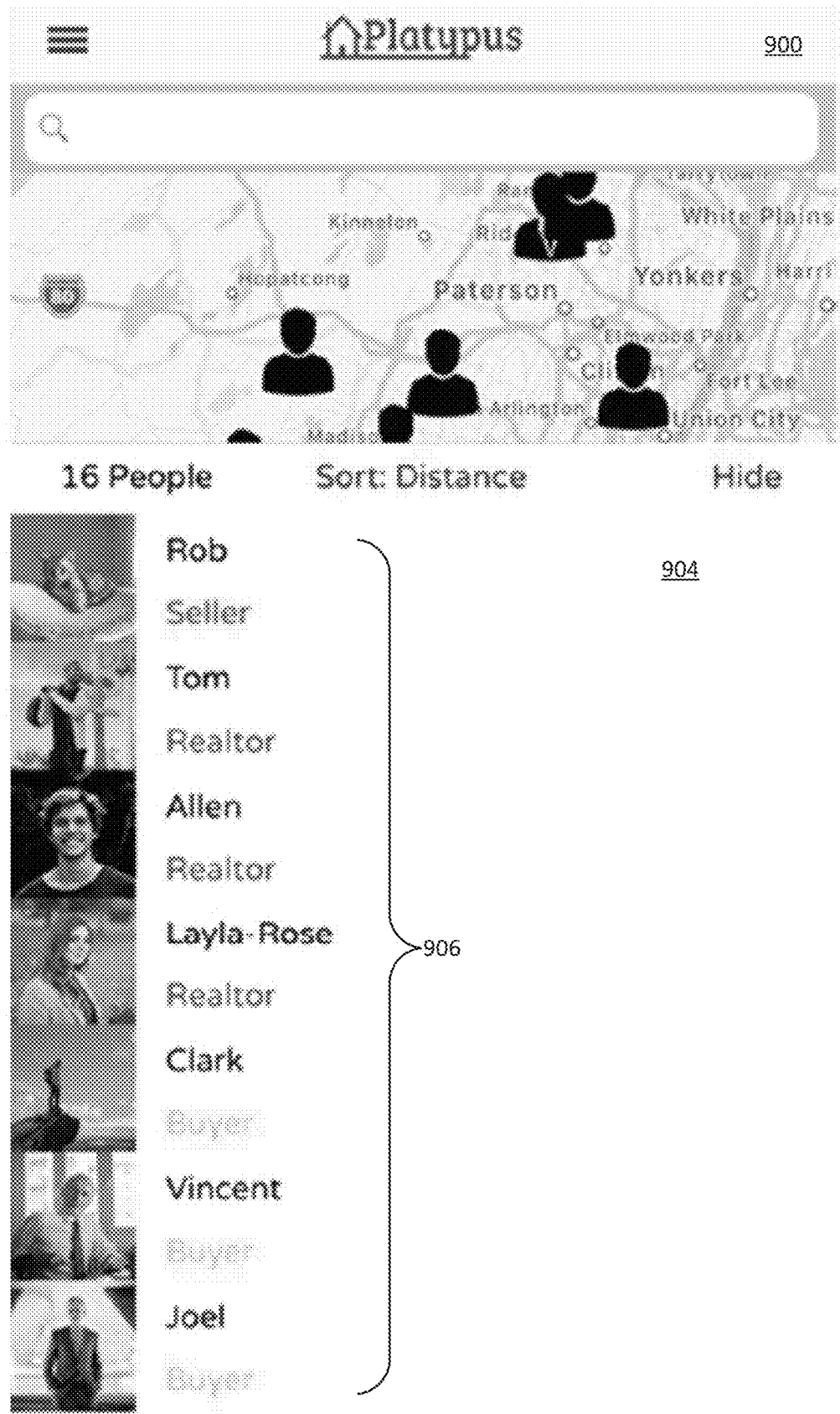
FIG. 9B illustrates a profile drawer of a system for connecting market participants, in accordance with various embodiments.

In various embodiments and with additional reference to FIGS. 9A and 9B, a map page 900 of system 100 is illustrated. The map page 900 may be configured to display icons 902 associated with matched market participants and an associated geographic location. In various embodiments, the icons 902 may be populated in response to the various metadata elements and based on the search distance 410. The map page 900 may include a profile drawer 904 which may be configured to expand in response to an interaction received by the user device 104 such as, for example, tapping on the profile drawer 904. In response to receiving the user interaction, the profile drawer 904 may expand to display a plurality of market participant profiles 906 associated with the icons 902.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQTM (formerly MQSeries) by IBM®, Inc. (Armonk, NY) is an example of a commercially available middleware product. An Enterprise Service Bus ("ESB") application is another example of middleware The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME' software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

The disclosure and claims do not describe only a particular outcome of a system for connecting market participants, but the disclosure and claims include specific rules for implementing the outcome of a system for connecting market participants and that render information into a specific format that is then used and applied to create the desired results of a system for connecting market participants, as set forth in *McRO, Inc.* v. *Bandai Namco Games America Inc.* (Fed. Cir. case number 15-1080, Sep. 13, 2016). In other words, the outcome of a system for connecting market participants can be performed by many different types of rules and combinations of rules, and this disclosure includes various embodiments with specific rules. While the absence of complete preemption may not guarantee that a claim is eligible, the disclosure does not sufficiently preempt the field of a system for connecting market participants at all. The disclosure acts to narrow, confine, and otherwise tie down the disclosure so as not to cover the general abstract idea of just a system for connecting market participants. Significantly, other systems and methods exist for a system for connecting market participants, so it would be inappropriate to assert that the claimed invention preempts the field or monopolizes the basic tools of a system for connecting market participants. In other words, the disclosure will not prevent others from a system for connecting market participants, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

What is claimed is:

1. A method, comprising:

receiving, by a computer based system, a first user data of a first user comprising a market participant type;

receiving, by the computer based system, a first metadata set associated with the first user data;

receiving, by the computer based system, a second metadata set associated with a second user data of a second user, wherein the second metadata set comprises the market participant type;

coordinating displaying, by the computer based system and on a first user device, a search and settings user interface that is auto-populated with the second metadata set;

coordinating displaying, by the computer based system and on the first user device, a user data page interface that is auto-populated with the first metadata set;

coordinating displaying, by the computer based system and on a second user device, a profile picture interface that is auto-populated with a profile picture from a social media website;

receiving, at the computer based system, a search query through the search and settings user interface, the search query comprising a search distance;

generating, by the computer based system, a match data based on the first metadata set, the second metadata set, and the market participant type, wherein the match data comprises a social graph defining an association between the first user data of the first user and the second user data of the second user;

determining, by the computer based system, a baseline user rating based on each of the first metadata set, the second metadata set, and the market participant type;

determining, by the computer based system, a match between the first user and the second user based on the baseline user rating, a listing data, the market participant type, the search distance, and the social graph;

coordinating displaying, by the computer based system and on the first user device, a map user interface comprising a profile drawer icon and a plurality of icons, wherein each of the icons are associated with a matched market participant of a plurality of matched market participants within the search distance and the plurality of matched market participants comprise the second user;

receiving, by the computer system and from the first user device, a selection of the profile drawer icon on the map user interface;

coordinating displaying, by the computer based system and on the first user device, an expanded profile drawer in place of the profile drawer icon on the map user interface, wherein the expanded profile drawer comprises a respective profile picture for each of the plurality of icons and the profile picture;

in response to the determining the match, generating, by the computer based system, a match page interface comprising the profile picture;

in response to receiving a selection of a confirm match icon on the match page interface, generating a communication channel between the first user device and the second user device based on the match;

updating, by the computer based system, the baseline user rating based on changes in each of the first metadata set, the second metadata set, and the market participant type;

executing, by the computer based system, a rating engine, operable to process the first user data, the second user data, the first metadata set, and the second metadata set, wherein in response to execution by the computer based system the rating engine generates the baseline user rating for the first user and the baseline user rating for the second user by processing elements of the first user data, the second user data, the first metadata set, and the second metadata set including at least one of a type tag, an interest tag, a location tag, closing data, sales data, buyer feedback, or seller feedback, wherein only the first user data and the first metadata set are processed by the rating engine to generate the baseline user rating for the first user and wherein only the second user data and the second metadata set are processed by the rating engine to generate the baseline user rating for the second user; and executing, by the computer based system, a matching engine, operable to generate a social graph, to generate the match data, and to further process the baseline user ratings, wherein in response to execution by the computer based system the matching engine generates the match data and feeds back the match data to the rating engine.

2. The method of claim 1, wherein the market participant type comprises at least one of 'buyer', 'seller', or 'broker'.

3. The method of claim 2, wherein the first metadata set and the second metadata set include at least one of interest tags, type tags, and location tags.

4. The method of claim 3, further comprising:
populating, by the computer based system, one of the location tags, type tags, or interest tags based on a frequency distribution.

5. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a first user data of a first user comprising a market participant type;
receiving, by the processor, a first metadata set associated with the first user data;
receiving, by the processor, a second metadata set associated with a second user data of a second user, wherein the second metadata set comprises the market participant type;
coordinating displaying, by the processor and on a first user device, a search and settings user interface that is auto-populated with the second metadata set;
coordinating displaying, by the processor and on the first user device, a user data page interface that is auto-populated with the first metadata set;
coordinating displaying, by the processor and on a second user device, a profile picture interface that is auto-populated with a profile picture from a social media website;
receiving, at the processor, a search query through the search and settings user interface, the search query comprising a search distance;
generating, by the processor, a match data based on the first metadata set, the second metadata set, and the market participant type,
wherein the match data comprises a social graph defining an association between the first user data of the first user and the second user data of the second user; and
generating, by the processor, a baseline user rating based on each of the first metadata set, the second metadata set, and the market participant type;
determining, by the processor, a match between users the first user and the second user based on the baseline user rating, a listing data, the market participant type, the search distance, and the social graph;
coordinating displaying, by the computer based system and on the first user device, a map user interface comprising a profile drawer icon and a plurality of icons,
wherein each of the icons are associated with a matched market participant of a plurality of matched market participants within the search distance and the plurality of matched market participants comprise the second user;
receiving, by the computer system and from the first user device, a selection of the profile drawer icon on the map user interface;
coordinating displaying, by the computer based system and on the first user device, an expanded profile drawer in place of the profile drawer icon on the map user interface,
wherein the expanded profile drawer comprises a respective profile picture for each of the plurality of icons and the profile picture;
in response to the determining the match, generating, by the computer based system, a match page interface comprising the profile picture;
in response to receiving a selection of a confirm match icon on the match page interface, generating a communication channel between the first user device and the second user device based on the match;
updating, by the processor, the baseline user rating based on changes in each of the first metadata set, the second metadata set, and the market participant type;
and wherein the tangible, non-transitory, memory comprises a set of computer readable code including:
a rating engine, executable by the processor, operable to process the first user data, the second user data, the first metadata set, and the second metadata set, wherein in response to execution by the processor the rating engine generates the baseline user rating for the first user and the baseline user rating for the second user by processing elements of the first user data, the second user data, the first metadata set, and the second metadata set including at least one of a type tag, an interest tag, a location tag, closing data, sales data, buyer feedback, or seller feedback,
wherein only the first user data and the first metadata set are processed by the rating engine to generate the baseline user rating for the first user and wherein only the second user data and the second metadata set are processed by the rating engine to generate the baseline user rating for the second user; and
a matching engine, executable by the processor, operable to generate a social graph, to generate the match data, and to further process the baseline user ratings, wherein in response to execution by the processor the matching engine generates the match data and feeds back the match data to the rating engine.

6. The system of claim 5, wherein the market participant type comprises at least one of 'buyer', 'seller', or 'broker'.

7. The system of claim 6, wherein the first metadata set and the second metadata set include at least one of interest tags, type tags, and location tags.

8. The system of claim 7, wherein the operations further comprise:
populating, by the processor, one of the location tags, type tags, or interest tags based on a frequency distribution.

9. An article of manufacture including a non-transitory, tangible computer readable storage medium having instructions stored thereon that, in response to execution by a computer based system, cause the computer based system to perform operations comprising:
receiving, by a computer based system, a first user data of a first user comprising a market participant type;
receiving, by the computer based system, a first metadata set associated with the first user data;
receiving, by the computer based system, a second metadata set associated with a second user data of a second user, wherein the second metadata set comprises the market participant type;
coordinating displaying, by the computer based system and on a first user device, a search and settings user interface that is auto-populated with the second metadata set;
coordinating displaying, by the computer based system and on the first user device, a user data page interface that is auto-populated with the first metadata set;

coordinating displaying, by the computer based system and on a second user device, a profile picture interface that is auto-populated with a profile picture from a social media website;

receiving, at the computer based system, a search query through the search and settings user interface, the search query comprising a search distance;

generating, by the computer based system, a match data based on the first metadata set, the second metadata set, and the market participant type, wherein the match data comprises a social graph defining an association between the first user data of the first user and the second user data of the second user;

determining, by the computer based system, a baseline user rating based on each of the first metadata set, the second metadata set, and the market participant type;

determining, by the computer based system, a match between the first user and the second user based on the baseline user rating, a listing data, the market participant type, the search distance, and the social graph;

coordinating displaying, by the computer based system and on the first user device, a map user interface comprising a profile drawer icon and a plurality of icons, wherein each of the icons are associated with a matched market participant of a plurality of matched market participants within the search distance and the plurality of matched market participants comprise the second user;

receiving, by the computer system and from the first user device, a selection of the profile drawer icon on the map user interface;

coordinating displaying, by the computer based system and on the first user device, an expanded profile drawer in place of the profile drawer icon on the map user interface, wherein the expanded profile drawer comprises a respective profile picture for each of the plurality of icons and the profile picture;

in response to the determining the match, generating, by the computer based system, a match page interface comprising the profile picture;

in response to receiving a selection of a confirm match icon on the match page interface, generating a communication channel between the first user device and the second user device based on the match;

updating, by the computer based system, the baseline user rating based on changes in each of the first metadata set, the second metadata set, and the market participant type;

executing, by the computer based system, a rating engine, operable to process the first user data, the second user data, the first metadata set, and the second metadata set, wherein in response to execution by the computer based system the rating engine generates the baseline user rating for the first user and the baseline user rating for the second user by processing elements of the first user data, the second user data, the first metadata set, and the second metadata set including at least one of a type tag, an interest tag, a location tag, closing data, sales data, buyer feedback, or seller feedback, wherein only the first user data and the first metadata set are processed by the rating engine to generate the baseline user rating for the first user and wherein only the second user data and the second metadata set are processed by the rating engine to generate the baseline user rating for the second user; and executing, by the computer based system, a matching engine, operable to generate a social graph, to generate the match data, and to further process the baseline user ratings, wherein in response to execution by the computer based system the matching engine generates the match data and feeds back the match data to the rating engine.

10. The article of manufacture of claim 9, wherein the market participant type comprises at least one of 'buyer', 'seller', or 'broker'.

11. The article of manufacture of claim 10, wherein the first metadata set and the second metadata set include at least one of interest tags, type tags, and location tags.

12. The article of manufacture of claim 11, wherein the operations further comprise:

populating, by the computer based system, one of the location tags, type tags, or interest tags based on a frequency distribution.

* * * * *